(12) United States Patent
Xue et al.

(10) Patent No.: US 12,010,620 B2
(45) Date of Patent: Jun. 11, 2024

(54) METHODS AND SYSTEM FOR FORWARD LINK POWER SAVING IN A STAR TOPOLOGY OF USER EQUIPMENT

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Junyi Li, Fairless Hills, PA (US); Chih-Hao Liu, San Diego, CA (US); Ozcan Ozturk, San Diego, CA (US); Piyush Gupta, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/443,236

(22) Filed: Jul. 22, 2021

(65) Prior Publication Data

US 2022/0070776 A1 Mar. 3, 2022

Related U.S. Application Data

(60) Provisional application No. 63/070,195, filed on Aug. 25, 2020.

(51) Int. Cl.
*H04W 52/02* (2009.01)
(52) U.S. Cl.
CPC .............................. *H04W 52/0229* (2013.01)
(58) Field of Classification Search
CPC ......... H04W 52/0229; H04W 52/0225; H04W 52/0219; H04W 72/25; H04W 92/18; Y02D 30/70
See application file for complete search history.

(56) References Cited

U.S. PATENT DOCUMENTS

| 2012/0008639 A1* | 1/2012 | Chen ..................... H04W 72/30 |
| | | 370/437 |
| 2014/0092753 A1* | 4/2014 | Vasseur ............... H04L 43/0876 |
| | | 370/248 |

(Continued)

FOREIGN PATENT DOCUMENTS

| CN | 109219116 A | 1/2019 |
| EP | 3826369 A1 | 5/2021 |

(Continued)

OTHER PUBLICATIONS

Intel Corporation: "Sidelink Enhancements for UE Power Saving", 3GPP Draft, 3GPP TSG RAN WG1 Meeting #102-E, R1-2005896, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051917798, 9 pages, Retrieved from the Internet: URL: https://ftp.3gpp.org/tsg_ran/WG1_RL1/TSGR1_102-e/Docs/R1-2005896.zip R1-2005896 Intel—eV2X Power Saving.docx [retrieved on Aug. 8, 2020], the whole document.

(Continued)

*Primary Examiner* — Marcos L Torres
(74) *Attorney, Agent, or Firm* — Haynes and Boone, LLP

(57) ABSTRACT

Wireless communications systems and methods related to power saving over a forward link of a star topology of user equipment (UE) are provided. In some aspects, a first UE may monitor the forward link connecting a second UE to the first UE for a control message transmitted by the second UE to the first UE. The first UE may then establish an operational mode based on the result of the monitoring for the control message, such as but not limited to a power saving mode or an active mode.

28 Claims, 8 Drawing Sheets

(56) References Cited

U.S. PATENT DOCUMENTS

2017/0230165 A1\* 8/2017 Yang ..................... H04W 76/14
2017/0245319 A1   8/2017 Yasukawa et al.
2023/0055280 A1\* 2/2023 Hwang ................. H04W 92/18

FOREIGN PATENT DOCUMENTS

WO    2018206124 A1   11/2018
WO    2021098100 A1    5/2021

OTHER PUBLICATIONS

International Search Report and Written Opinion—PCT/US2021/042851—ISA/EPO—dated Nov. 12, 2021.

\* cited by examiner

| UE ID | Bit Value |
|---|---|
| 0 | 1 |
| 1 | 0 |
| 2 | 1 |
| 3 | 1 |

| | |
|---|---|
| N-1 | 0 |
| N | 1 |

FIG. 4

METHODS AND SYSTEM FOR FORWARD LINK POWER SAVING IN A STAR TOPOLOGY OF USER EQUIPMENT

CROSS-REFERENCE TO RELATED APPLICATIONS

The present application claims priority to and the benefit of the U.S. Provisional Patent Application No. 63/070,195, filed Aug. 25, 2020, titled "Methods and System for Forward Link Power Saving in a Star Topology of User Equipment," which is hereby incorporated by reference in its entirety as if fully set forth below and for all applicable purposes.

TECHNICAL FIELD

This application relates to wireless communication systems, and more particularly to power saving over a forward link of a star topology of user equipment.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum. Additionally, NR sidelink may be extended to support applications in other domains, such as enhanced mobile broadband (eMBB), ultra-reliable low-latency communications (URLLC), etc.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the present disclosure, a method of wireless communication performed by a first user equipment (UE), includes monitoring, for a first duration, a forward link connecting a second UE to the first UE for a control message transmitted by the second UE to the first UE. Further, the method comprises establishing an operational mode based on a result of the monitoring for the control message.

In some aspects, a first user equipment (UE) comprises a processor configured to monitor, for a first duration, a forward link connecting a second UE to the first UE for a control message transmitted by the second UE to the first UE. The processor is further configured to establish an operational mode based on a result of the monitoring for the control message.

In some aspects of the present disclosure, a non-transitory computer-readable medium having program code recorded thereon is disclosed. In some aspects, the program code comprises code for causing a first user equipment (UE) to monitor, for a first duration, a forward link connecting a second UE to the first UE for a control message transmitted by the second UE to the first UE. The program code further comprises code for causing the UE to establish an operational mode based on a result of the monitoring for the control message.

In some aspects of the present disclosure, a first user equipment (UE) comprises means for causing a UE to monitor, for a first duration, a forward link connecting a second UE to the first UE for a control message transmitted by the second UE to the first UE. Further, the first UE comprises means for causing the UE to establish an operational mode based on a result of the monitoring for the control message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 illustrates a bitmap-based group control message for forward link power saving, according to some aspects of the present disclosure.

DETAILED DESCRIPTION

Figure 1:
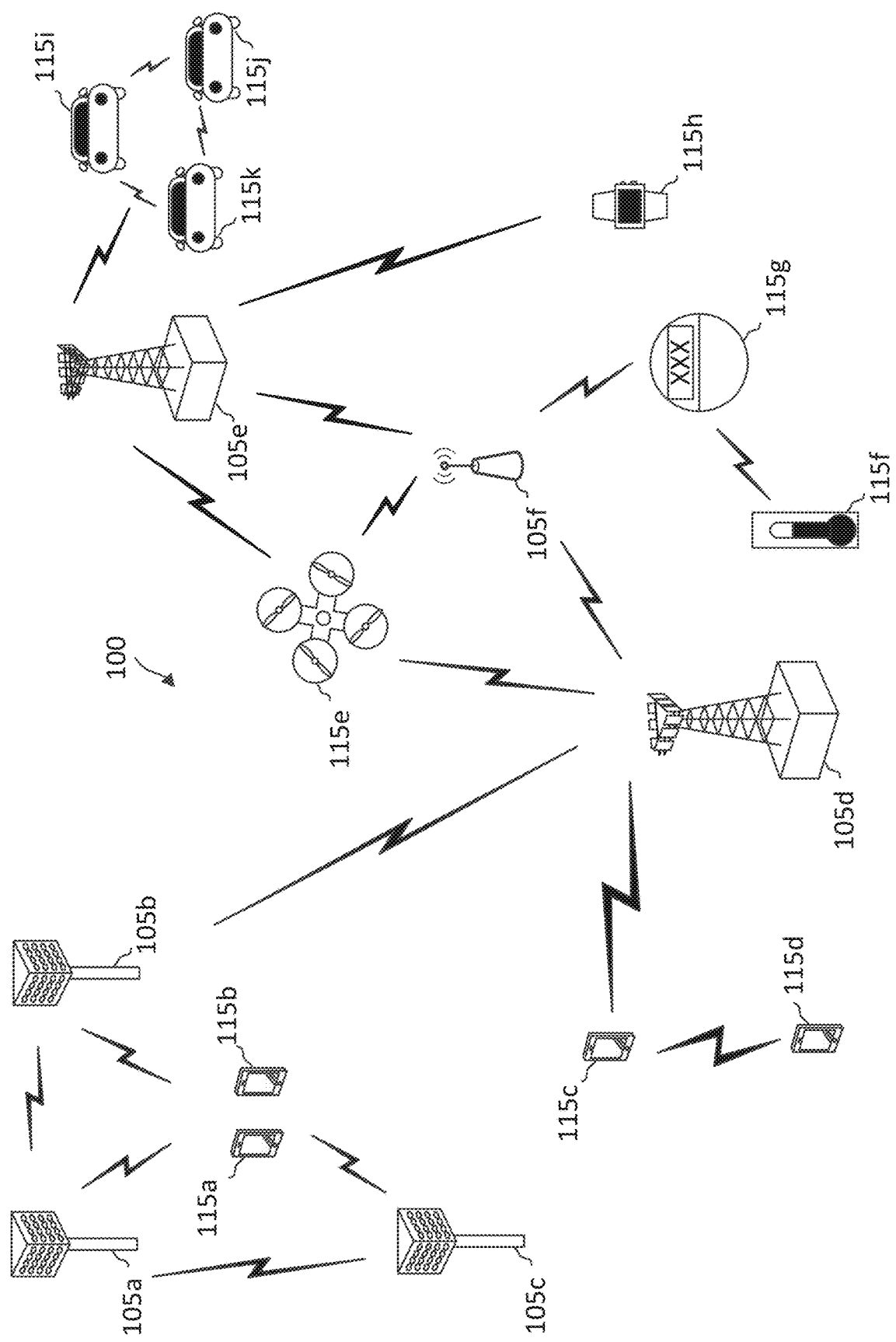
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some cases, the SCI may include two stages of control information, the first control information SCI-1, carried over PSCCH, including occupancy and/or reservation information understood by receiving UEs and the second control information SCI-2, carried over PSSCH, including control information for targeted receives (i.e., receives that are to receive the data being transmitted via PSSCH).

Further, physical sidelink feedback channel (PSFCH) can be used to communicate hybrid automatic repeat request acknowledgment/negative acknowledgment (HARQ ACK/NACK) messages between the UEs (e.g., for reliable unicast). For instance, a sidelink receiver UE can transmit a sequence carrying a 1-bit HARQ response to a sidelink transmitter UE two slots later. Use cases for sidelink communication may include peer-to-peer communications and/or star topology networks/applications such as but not limited to V2X, intelligent transport systems (ITS), enhanced mobile broadband (eMBB), industrial IoT (IIoT), ultra-reliable low-latency communications (URLLC), NR-lite, and/or the like.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., next generation NodeB (gNB)) may determine a radio resource on behalf of a sidelink (SL) UE and transmit an indication of the radio resource to the SL UE. That is, a SL UE may receive grant from a gNB for channel access. The mode-2 RRA supports autonomous or standalone RRA where a SL peripheral UE, such as but not limited to out-of-coverage SL UEs or partial-coverage SL UEs, may conduct sensing to autonomously occupy or reserve channel access. A SL peripheral UE may be preconfigured with a sidelink resource pool and may select a radio resource from the preconfigured sidelink resource pool for sidelink communication. A distributed congestion control or quality of service mechanism may regulate at least aspects of channel access by SL UEs. For example, a distributed congestion control may specify a range of channel occupancy ratios (CRs) for a given channel busy ratio (CBR) (e.g., suitable for general sidelink applications) and specify a number of allowable retransmissions without reducing a transmit power. Each SL UE may measure its own CBR, which may be mapped to a CR limit to regulate the number of channel use within a sliding window of time. For this mode, it may be possible for sidelink systems to operate independent of a serving BS. A CBR is a metric indicating a number of subchannels (e.g., frequency subbands) in a sidelink resource pool with a measured receive signal strength indicator (RSSI) greater than a preconfigured threshold divided by the total number of subchannels in the resource pool. The CBR metric can be computed for a certain number of time intervals or subframes. The CBR can provide an estimation on the total state of the channel.

Besides peer-to-peer communications, NR use cases such as eMBB and URLLC employ star topology where a hub node (e.g., a SL hub UE) can serve as an information source, an information sink, or both to multiple peripheral nodes (e.g., SL peripheral UEs). That is, for example, within a star network, multiple peripheral UEs can transmit data to and/or receive data from a hub UE. The role of a hub UE or a peripheral UE may not be fixed in that a hub UE can become a peripheral UE, and vice versa, based on the traffic flow. Further, the traffic to/from peripheral UEs can be non-deterministic (e.g., fully random or with non-trivial jitter over a coarse pattern). In some cases, multiple star topology UE networks may share same resource pools (e.g., radio resource pools), and as such a single SCI can be used to occupy at least portions of said resource pools (e.g., subchannels). Further, as peripheral UEs tend to be powered by battery, star topology UE networks may be designed with power saving considerations.

With respect to the forward link (i.e., the link in the direction from a SL hub UE to a SL peripheral UE), for instance in cases where the forward link is discontinuous reception (DRX) arranged, a SL peripheral UE may attempt to conserve power by safely shutting down its radio from monitoring the forward link for a control message (e.g., SCI). The arrival of a data packet may trigger the SL peripheral UE to sense the channel (e.g., including synchronization) and send data over a secured sub-channel. In some cases, the sensing, however, can be time and power consuming, in particular when congestion occurs due to temporal peak or hot time. Solutions that allow partial sensing to access a partitioned resource pool such as in vehicle-to-pedestrian (V2P) technologies in Release 17 of 3GPP may reduce the time/power consumption. However, pool partition can unavoidably damage trunking gain. As such, there is a desire to provide improved methods and system for power saving in a forward link of a star topology network of UEs.

In some aspects, in particular when SL peripheral UEs are stationary or almost stationary, upper radio protocol layers can be used for power saving purposes. For power saving in a forward link of a star topology network of UEs, a SL hub UE can use the upper layer protocols to negotiate with a SL peripheral UE for a radio protocol layer L2-above paging window to send randomly arriving data that may have a low effective traffic duty cycle. For example, a SL peripheral UE may search a full window (e.g., and decoding SCI-1 and SCI-2), where the window may be relatively large to accommodate uncertainty that may exist in the SL hub UE's channel contention and/or temporal congestion due to random traffic arrivals. For larger power saving gains, in some cases, L1/L2 may be optimized.

Aspects of the present disclosure can provide several benefits. In some aspects, SL peripheral UEs in a star topology network of UEs may reduce their power consumption that may occur due to the need to sense forward links. For example, as discussed below, a SL peripheral UE that is informed via a control message (e.g., SCI) from a SL hub UE that there is no upcoming data from the SL hub UE may return to power saving mode without additional searching or monitoring of the forward link, thereby reducing its power consumption. Examples of power saving mode include sleep mode, low-power mode, etc.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA). In some other aspects, the network 100 may support sidelink communication among the UEs 115 in a licensed frequency band.

In some aspects, a UE 115 may be part of a network of UEs in a star topology (e.g., a network including 115$k$, 115$j$ and 115$i$). That is, a UE 115 can be a SL hub UE serving as an information source, an information sink, or both to multiple SL peripheral UEs. In some cases, the same UE 115 can also be a SL peripheral UE (e.g., in the same or different star topology network of UEs. Each SL peripheral UE 115 of a star topology network of UEs may monitor a forward link of the star topology for a control message (e.g., SCI, medium access control (MAC)-control element (CE), upper layer control packet, etc.) to determine whether there are upcoming data packets over the forward link, and select an operational mode for the SL peripheral UE 115 that improves the power consumption of the SL peripheral UE 115 based on the determination. Mechanisms for such saving power over a forward link of a star topology of user equipment are described in greater detail herein.

Figure 2:
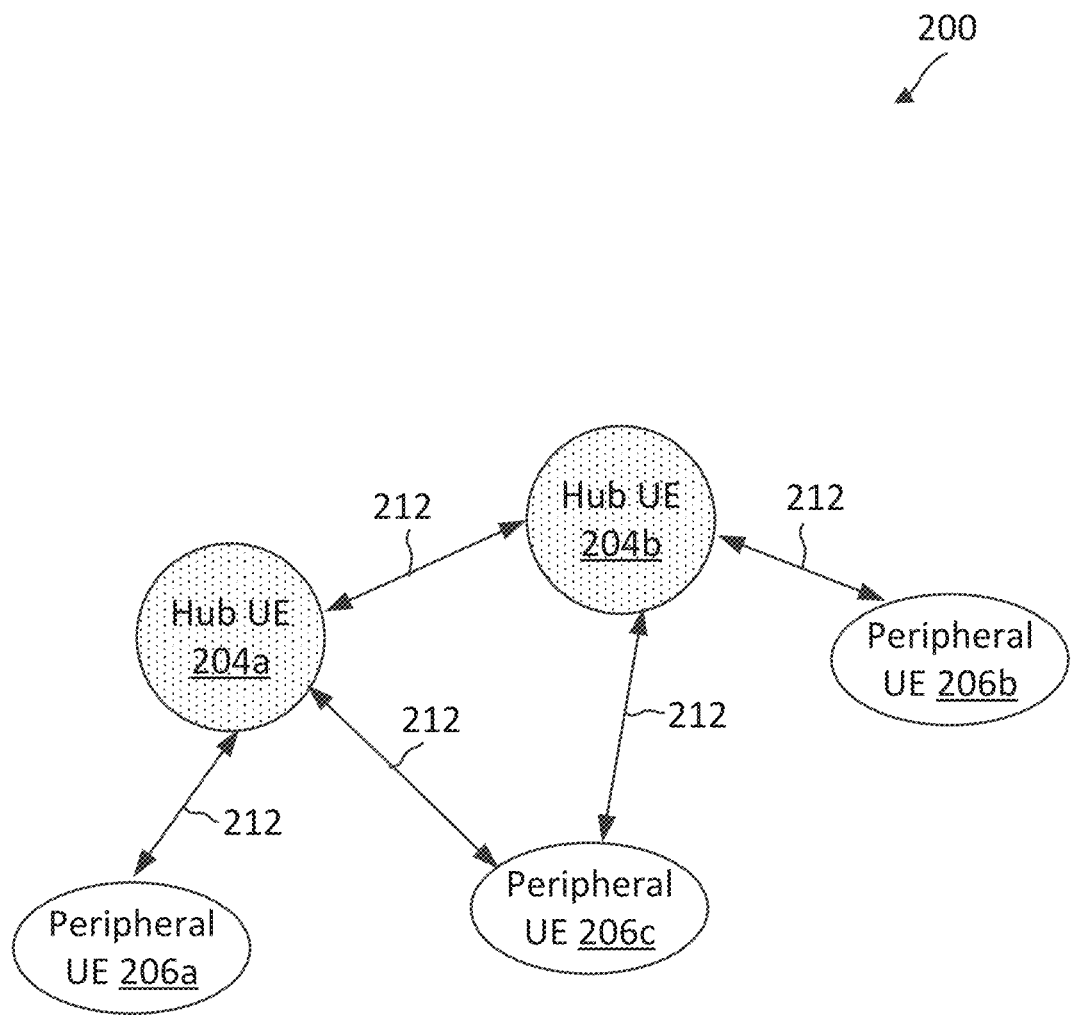
FIG. 2 illustrates a star topology deployment of user equipment (UE) network, according to some aspects of the present disclosure.

FIG. 2 illustrates a star topology deployment of UE network, according to some aspects of the present disclosure. The star topology deployment 200 of a network of UEs may correspond to a portion of the network 100. The star topology deployment 200 includes a plurality of SL hub UEs 204 (shown as 204*a* and 204*b*) and a plurality of SL peripheral UEs 206 (shown as 206*a*, 206*b*, 206*c* and 206*d*) as part of a star topology network of UEs 200. Although the star topology deployment 200 is illustrated with two SL hub UEs 204 and four SL peripheral UEs 206, it should be understood in other examples a star topology deployment of a network of UEs can include any suitable number of SL hub UEs 204 (e.g., 1, 3, 4, 5, 6 or more) and any suitable number of SL peripheral UEs 206 (e.g., 1, 2, 3, 5, 6, 7, 8, 9, 10 or more). The SL hub UEs 204 and the SL peripheral UEs 206 may correspond to UEs 115 in the network 100. The SL hub UEs 204 and/or the SL peripheral UEs 206 may be UEs that are equipped with wireless communication devices. In an IIOT setting, the SL peripheral UEs 206 may be machines, industrial equipment, robots, sensors, actuators, and/or the like equipped with wireless communication devices. The SL hub UEs 204 may control the operations of the SL peripheral UEs 206, for example, by sending control commands (e.g., SCIs) to the SL peripheral UEs 206. The SL hub UEs 204 may also read data, record, and/or measurements from the SL peripheral UEs 206. The communication between the SL hub UEs 206 and the SL peripheral UEs 204 may be over wireless channels (e.g., the sidelink 212). In some cases, the roles of a SL hub and a SL peripheral UE may not be fixed and may be determined by the flow of data traffic. For example, a different star topology network of UEs where the SL hub UE serves as an information sink may have UE 206c as a SL hub UE of the network when data traffic is flowing from UE 204a, 204b and 206a into UE 206c. In such cases, the rest of the UEs (i.e., 204a, 204b, 206a, 206b) may serve as SL peripheral UEs.

Figure 3:
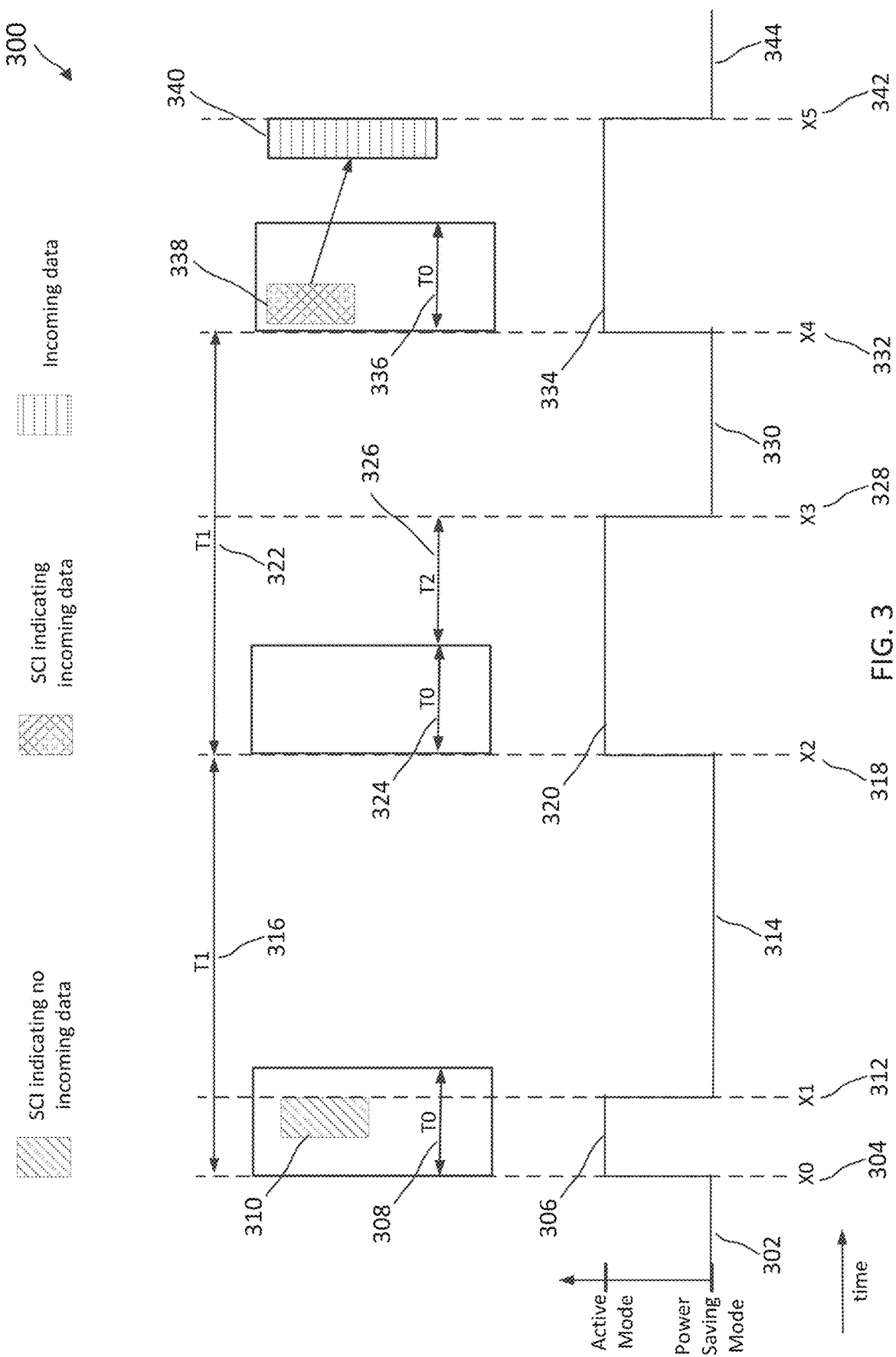
FIG. 3 shows an example illustration of a sidelink (SL) peripheral UE monitoring a forward link of a star topology network of UEs for a control message, according to some aspects of the present disclosure.

FIG. 3 shows an example illustration of a forward link power saving mechanism 300 where a peripheral UE monitors a forward link of a star topology network of UEs for a control message, according to some aspects of the present disclosure. The forward link power saving mechanism 300 may be implemented in a star topology network of UEs including a SL peripheral UE and associating SL hub UE. The SL hub UE and the SL peripheral UE may correspond to SL hub UE 204 and SL peripheral UEs 206 in the star topology deployment of a network of UEs 200, for example.

In some aspects, a SL peripheral UE may be in a power saving operational mode 302 before waking up from or exiting the power saving mode 302 at time X0 304 to enter an active operational mode 306. The power saving mode can be, for example, a lower power state or an off state of the SL peripheral UE. In some aspects, the SL peripheral UE may be configured to stay in the active mode 306 for up to a pre-determined time window or duration T0 308 in search of a control message from the associating SL hub UE. That is, while in the active mode 306, the SL peripheral UE may monitor the forward link (i.e., the link in the direction from the associating SL hub UE to the SL peripheral UE) for a control message from the SL hub UE, an example of a control message including but not limited to SCI, MAC-CE, upper layer control packet, etc. In some aspects, the control message can be a wake-up and search (WUS) control message configured to inform the SL peripheral UE about data being buffered, i.e., whether there is or there is no upcoming data transmission from the SL hub UE to the SL peripheral UE. In some aspects, during the monitoring of the forward link, the SL peripheral UE may detect a WUS control message 310 indicating to the SL peripheral UE that there is no data being buffered, i.e., there is no data incoming for the SL peripheral UE from the SL hub UE. In some cases, the control message 310 may include an index related to the SL peripheral UE and may associate the index with the indication about absence of data buffering. For example, as discussed below, the control message 310 may include a bitmap associating the index with the bit "1", which may indicate that there is no upcoming data transmission for the SL peripheral UE (e.g., and as such the SL peripheral UE may enter power saving mode). In such cases, the SL peripheral UE may be configured to recognize the index and as such the SL peripheral UE may use the index to look up in the control message 310 the associated information about the absence of upcoming data transmission. In some cases, the index or the SL peripheral UE's identification number can be an association identification number assigned to the SL peripheral UE when the SL peripheral UE is associated with the star topology network of UEs with the SL hub UE.

In some aspects, after detecting the control message 310 with the indication that the SL peripheral UE can go back to power saving mode 314 (e.g., because the control message 310 indicates that the SL peripheral UE has no data being buffered), the SL peripheral UE may enter power saving mode 314 at time X1 312. In some cases, the SL peripheral UE may not wait until the entire pre-determined duration T0 308 (i.e., the duration for searching for the control message) expires before exiting the active mode 306 and entering the power saving mode 314. That is, for example, if the SL peripheral UE completes receiving the control message 310 at time X1 312 before the pre-determined duration T0 308 expires, the SL peripheral UE may exit the active mode 306 at time X1 before the pre-determined duration T0 308 expires and the SL peripheral UE enters power saving mode 314.

In some aspects, entering the power saving mode 314, the SL peripheral UE may exit the power saving mode 314 to enter the active mode 320 at time X2 318 a duration T1 316 after the SL peripheral UE exited the last power saving mode 302 at time X0 304 to enter the active mode 306. In other words, the SL peripheral UE may be configured to monitor the forward link connecting it to its associating SL hub UE with a forward link monitoring periodicity of T1. In some aspects, the SL peripheral UE may monitor the forward link for a control message from the associating SL hub UE while in the active mode 320. For example, the SL peripheral UE may be configured to monitor the forward link, while in an active mode, for the pre-determined duration T0, and as such, after entering the active mode 320 at time X2 318, the SL peripheral UE may monitor the forward link for the pre-determined duration T0 324. In some aspects, the SL peripheral UE may not detect a control message in the forward link during the pre-determined duration T0 324. In some aspects, the SL peripheral UE may detect a control message in the forward link during the pre-determined duration T0 324, but the control message may have no indication related to an upcoming arrival or non-arrival of a data transmission from the SL hub UE to the SL peripheral UE. In such cases, i.e., when no control message is detected or a detected control message includes no indication about an upcoming arrival or non-arrival of data transmission, the SL peripheral UE may remain in the active mode 320 for a duration T2 326 searching the forward link for possible data transmission from the associating SL hub UE to the SL peripheral UE. That is, after failing to receive any indication about a data transmission from the associating SL hub UE in the forward link connecting the associating SL hub UE to the SL peripheral UE, the SL peripheral UE may remain in the active mode 320 for additional data transmission search duration T2 326 to monitor or search for data transmission from the associating SL hub UE. In some aspects, the SL peripheral UE may then enter power saving mode 330 at time X3 after expiration of the data transmission search duration T2 326 without receiving or detecting data transmission from the associating SL hub UE.

In some aspects, as discussed above, the SL peripheral UE is configured to exit power saving modes and enter active modes to monitor the forward link with a periodicity of duration T1. As such, after entering the power saving mode 330 at time X3, the SL peripheral UE may exit the power saving mode 330 at time X4 332 a duration T1 322 after the last time X2 318 that the SL peripheral UE exited a power saving mode 314 to enter an active mode 320 to monitor the forward link. In some aspects, while in an active mode (e.g., such as the active mode 334), the SL peripheral UE may monitor the forward link for up to the pre-determined duration T0 336. In some aspects, the SL peripheral UE may detect a control message 338 indicating that the SL peripheral UE has data being buffered, i.e., indicating an upcoming data transmission from the SL hub UE to the SL peripheral UE. In some cases, the SL peripheral UE may remain in the active mode 334 to receive the data transmission 340 by time X5 342. In some cases, the SL peripheral UE may remain in the active mode 334 for at least the pre-determined duration T0 336. In such cases, the SL peripheral UE may remain in the active mode 334 for the rest of the time until the data transmission 340 indicated as incoming data by the control message 338 is received by time X5 342 as discussed above, or the SL peripheral UE can enter another operational mode (e.g., power saving mode) after the expiration of the pre-determined duration T0 336 provided that the SL peripheral UE re-enters the active mode 334 in time to receive the incoming data 340. In some aspects, after receiving the data transmission 340 at time X5 342, the SL peripheral UE may enter the power saving mode 344 and remain in that mode for T1 duration measured time X4. In some aspects, the SL peripheral UE may then proceed with periodically (e.g., with a periodicity of T1) monitoring the forward link for control message and/or data transmission as discussed above.

In some aspects, a SL peripheral UE may be configured to perform forward traffic monitoring (e.g., as discussed above) by the associating SL hub UE. For example, an associating hub UE may transmit a control message (e.g., the WUS control message such as 310 or 338) to configure the SL peripheral UE to perform the forward traffic search for data transmission from the SL hub UE (or to go to power saving mode because there is no data buffering, for example). In some cases, the control message can be a SCI. In some aspects, the SCI can be a two-stage SCI, a first control information SCI-1 carried over PSCCH and including occupancy and/or reservation information understood by the SL peripheral UE and a second control information SCI-2 including control information appended to a data transmission that is carried by the PSSCH. In such cases, the SCI-1 maybe a legacy SCI (e.g., such as those in Release 16 of the 3GPP) while SCI-2 may include all other information related to the forward traffic monitoring, such as but not limited to indications indicating about the presence or absence of an upcoming data transmission from an associating SL hub UE to the SL peripheral UE, and information related to the pre-determined time window or duration T0 for monitoring a forward traffic for a control message, the forward link monitoring periodicity of T1 and/or the duration T2 for remaining in an active mode after failure to receive a control message. For instance, the SCI-2 may include values or ranges for T0, T1 and/or T2. In some cases, the SCI-1 and SCI-2 may be transmitted to the SL peripheral UE together. In some cases, the SCI-2 may be transmitted to the SL peripheral UE independent of SCI-1; for example, the SCI-2 may be appended to a data transmission via PSSCH from the SL hub UE to the SL peripheral UE. In some cases, all information related to the forward traffic monitoring (i.e., "WUS related information") can be appended to a data transmission when same modulation and coding scheme (MCS) is used to save cyclic redundancy check (CRC) bits.

In some aspects, the WUS related information may be included in a SCI-1. That is, the SCI-1 that is carried over PSCCH may contain WUS related information in addition to the occupancy and/or reservation information that are included in SCI-1 of Release 16 of 3GPP and understood by the SL peripheral UE. For example, the SCI-1 may include new or scrambled bits related to the WUS related information. For instance, new or repurposed bits can be used in such SCI-1 for new unlicensed bands without corresponding legacy UEs. In some aspects, scrambling can be used for so-called "light-weight" SCI-only transmissions, i.e., SCI only transmissions that occupy a sub-channel partially and/or have a low coding rate and low transmission power. In some aspects, a SL peripheral UE may be allowed to occupy a sub-channel without sensing (e.g., without LBT) to transmit such SCI-only transmissions. In some cases, the "light-weight" feature, i.e., the aspect of the SCI-only transmissions related to partial occupancy of sub-channels and/or low coding rate/transmission power, may aid with reducing impact of any collision during channel use (e.g., when channel is occupied without sensing).

Figure 4:
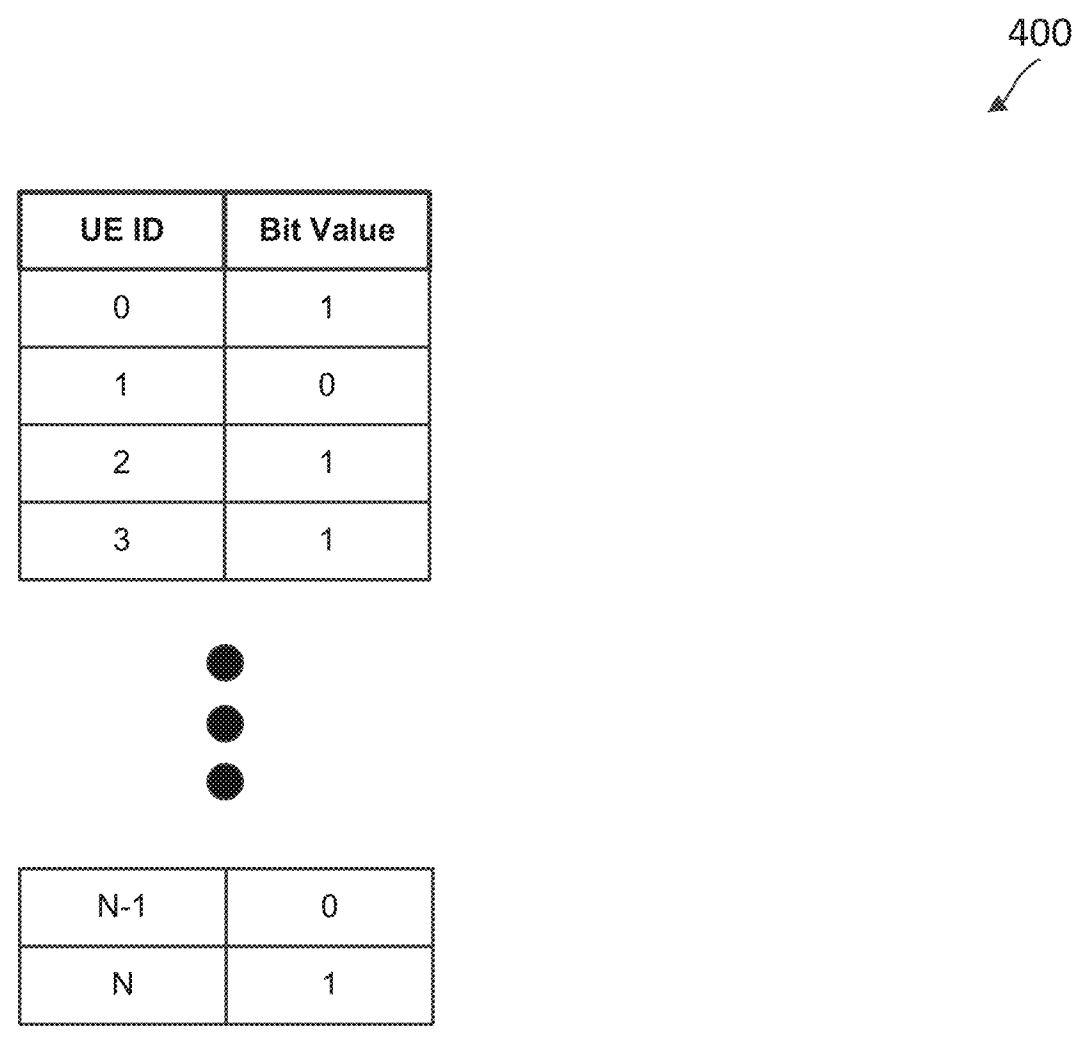

FIG. 4 illustrates a bitmap-based group control message for forward link power saving, according to some aspects of the present disclosure. In some aspects, the star topology network of UEs may comprise a limited or small number of SL UEs (e.g., less than about 100, less than about 50, less than about 10, etc., including values and subranges therebetween). In such cases, the control message (e.g., such as 310 and 338) transmitted to a SL peripheral UE (e.g., such as SL peripheral UE 206) of the SL UEs may be a group-common control message including WUS related information directed to a subset of or all the SL peripheral UEs in the star topology UE network. For example, the WUS related information may indicate to the subset or all the SL peripheral UEs whether there is an upcoming data transmission from the SL hub UE to the subset or all the SL peripheral UEs, which may allow the SL peripheral UEs to determine whether to remain in an active mode or enter a power saving mode.

In some aspects, the WUS related information may be formatted as a bitmap including, for each SL peripheral UE of the subset or all SL peripheral UEs, an index (e.g., identification number) of that SL peripheral UE and a respective WUS related information associated with that index. For example, an index can be a low bit width association identification number (e.g., different from radio network temporary identifier (RNTI) of a NR network) associating a SL peripheral UE to a WUS related information for the SL peripheral UE. In some cases, each of the some or all of SL peripheral UEs may be configured to recognize their associated index in the group common control message. As such, a SL peripheral UE may retrieve the WUS related information intended for it by referring to its index in the group control message and retrieving the WUS related information associated with that index. In some aspects, the WUS related information for a SL peripheral UE may include an indication indicating to the SL peripheral UE whether there is an upcoming data transmission to the SL peripheral UE (and as such, whether the SL peripheral UE should enter to power saving mode or remain in active mode to receive the data transmission). In some aspects, the WUS related information may include additional information. For example, the group-common control message may dynamically configure SL peripheral UE or UEs for the forward link monitoring, and in such cases, the WUS related information in the group-common control message may include values for T0, T1 and/or T2 to override the pre-configured values.

FIG. 4 shows an example bitmap of a control message (such as a SCI, a MAC-CE, an upper layer control packet, etc.) including N+1 indices identifying N+1 SL peripheral UEs of a star topology network of UEs and WUS related information for each SL peripheral UE of the N+1 SL peripheral UEs. In some aspects, the WUS related information may include bit values representing the upcoming arrival or non-arrival of data transmission from the SL hub UE of the star topology network of UEs to the respective SL peripheral UEs. For example, with respect to the non-limiting example of FIG. 4, the bit value "1" may indicate that there is no upcoming data transmission (and as such, the SL peripheral UE identified by an index that corresponds with a bit value of "1" may enter a power saving mode). For instance, in FIG. 4, SL peripheral UEs with UE indices 0, 2, 3, and N may enter power saving mode upon receiving the control message that includes the bitmap. In some aspects, the bit value "0" may indicate that there is upcoming data transmission (and as such, the SL peripheral UE identified by an index that corresponds with a bit value of "0" may remain in active mode to receive the data transmission). For instance, in FIG. 4, SL peripheral UEs with UE indices 1 and N−1 may remain or operate in active mode upon receiving the control message that includes the bitmap to receive the data transmission.

In some aspects, the SL peripheral UEs with upcoming data transmission (e.g., SL peripheral UEs with UE indices 1 and N−1) may also receive as part of the control message common values and/or dedicated values that are configured to override pre-configured values of the SL peripheral UEs related to the monitoring of a forward link for power saving purposes. For example, SL peripheral UEs may be pre-configured with values such as (i) the duration (e.g., T2 326 in FIG. 3) a SL peripheral UE should remain in an active mode when receiving no control message or no indication of an upcoming data transmission, (ii) the duration a SL peripheral UE should remain in an active mode when waiting for an upcoming data transmission indicated by a control message (e.g., the duration between receiving control message 338 and receiving data transmission 340), and/or the like. In such cases, the control message may include the common values and/or the dedicated values to override such pre-configured values. In some aspects, the common values may apply to all the SL peripheral UEs receiving the control message and to which the bitmap indicates there is an upcoming data transmission (e.g., UE indices 1 and N−1 in FIG. 4). In some aspects, the dedicated values may apply to the SL peripheral UEs to which the dedicated values are directed. In some aspects, a dedicated value may specify a time at which a SL peripheral UE may exit a power saving mode other than the periodic times (e.g., X0, X2, X4, etc.) at which the SL peripheral UE is scheduled to exit a power saving mode.

In some aspects, a control message, whether directed to individual SL peripheral UEs or as a group common control message directed to multiple SL peripheral UEs, may include dynamic adjustments to the pre-configured values of the UEs. For example, the values T0, T1 and T2 in FIG. 3 may be pre-configured. Further, the time duration between receiving control message 338 and receiving data transmission 340 that a SL peripheral UE should remain in active mode (i.e., after receiving control message 338 but while waiting for data transmission 340) may also be pre-configured. In such cases, the control messages received by a SL peripheral UE, such as the control message 310 indicating no upcoming data transmission, the control message 338 indicating the upcoming data transmission 340, any possible control message during T0 324 with no indication of the arrival or non-arrival of a data transmission, etc., may also include a values or adjustment to override the pre-configured values. For example, any of these control messages may include adjustments or values for adjusting or overriding T0, T1, T2 and/or the time duration between receiving control message 338 and receiving data transmission 340. For instance, the control message 338 may include an adjustment or a value for overriding the pre-configured time duration between receiving control message 338 and receiving data transmission 340 that a SL peripheral UE should remain in active mode. In some cases, the adjustment or value may depend on the amount of the data transmission (e.g., larger value when the data transmission is abnormally large and vice versa). As another instance, a control message during T0 324 without any indication of the arrival or non-arrival of a data transmission may include an adjustment or value for overriding T2. In some aspects, the control messages may also include an instruction instructing the SL peripheral UEs to exit a power saving mode (e.g., 302, 314, 330, 344, etc.) when not scheduled to do so, for example, during between X1 312 and X2 318 or between X3 328 and X4 332). In some aspects, the control messages may be control messages directed at individual SL peripheral UEs or can be group common control messages. Further, a control message can be a SCI, a MAC-CE, an upper layer control packet, and/or the like.

Figure 5:
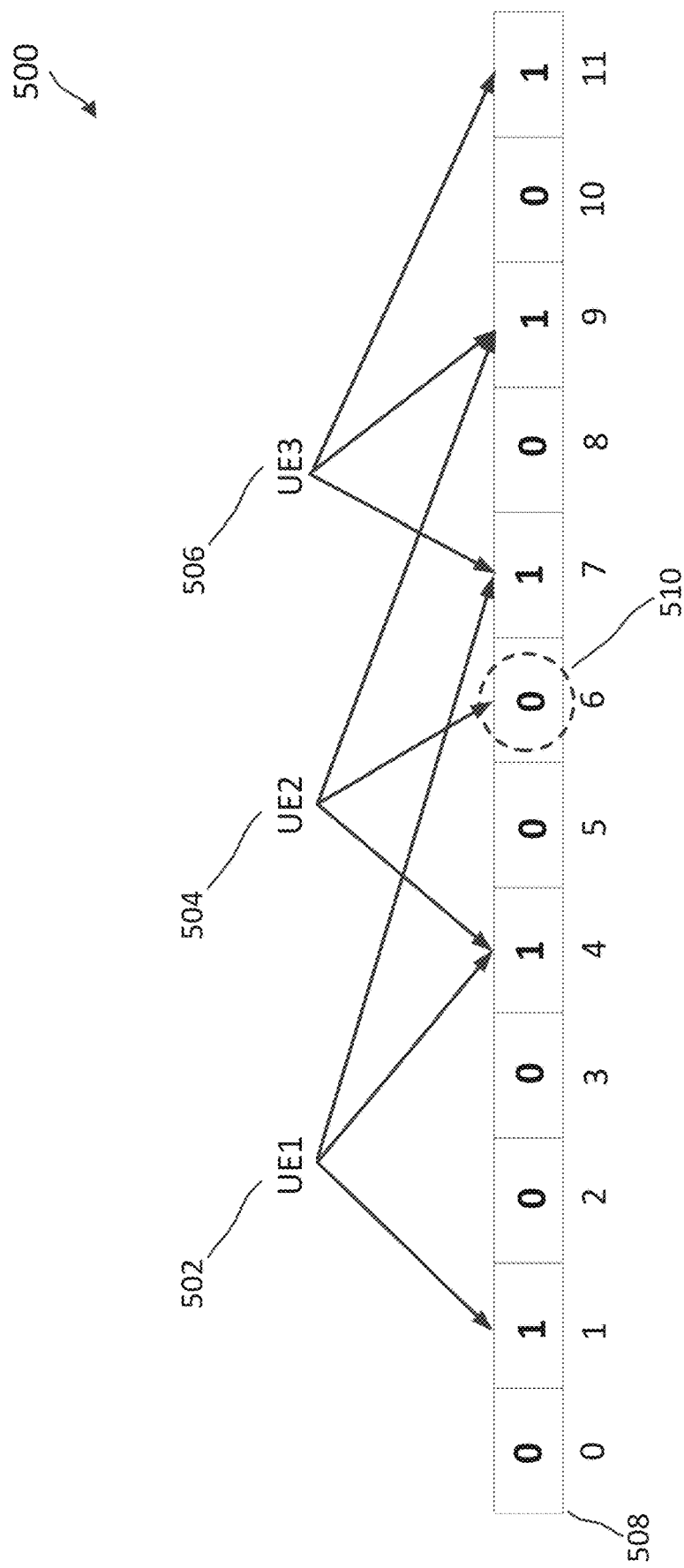
FIG. 5 illustrates a bloom filter-based group control message for forward link power saving, according to some aspects of the present disclosure.

FIG. 5 illustrates a bloom filter-based group control message for forward link power saving, according to some aspects of the present disclosure. In some aspects, a group-common control message that includes WUS related information for multiple SL peripheral UEs of a star topology network of SL peripheral UEs may not include SL peripheral UE-identifying indices that the SL peripheral UEs can use to retrieve the WUS related information. In some aspects, the SL peripheral UEs may not be configured to recognize indices (e.g., if the indices are in fact present in the control message). In such cases, the group-common control message may be a bloom filter-based control message carrying m-bit bitmap or m-bit vector (i.e., a bitmap or vector of length m that includes only "0" or "1" bit values). A bloom filter can be viewed as a space-efficient data structure that allows for (i) an efficient and definite determination about the absence of an item in the data structure and (ii) an efficient but probabilistic determination about the presence of an item in the data structure. That is, a bloom filter can give false positive about the presence of the item in the data structure but cannot give a false negative. In some aspects, the aforementioned "item" may represent data transmission from a SL hub UE to a SL peripheral UE, and a bloom filter for a control message from a SL hub UE to SL peripheral UEs of a star topology network of SL peripheral UEs may be designed such that a bit value of 0 indicates a definite determination that there is no upcoming data transmission and a bit value of 1 indicates a probabilistic determination that there may be an upcoming data transmission. For example, with respect to the non-limiting example of FIG. 5, a bit value "0" corresponding to a SL peripheral UE may indicate that the SL peripheral UE has no data buffering (and as such, the SL peripheral UE may enter a power saving mode) while a bit value "1" a bit value "0" corresponding to a SL peripheral UE may indicate that the SL peripheral UE may have data buffering (but, as noted above, it can be a false positive).

In some aspects, one may construct a bloom filter for a control message from a SL hub UE to SL peripheral UEs of a star topology network of SL peripheral UEs as follows. Initially, each SL peripheral UE of the star topology network of SL peripheral UEs may be assigned k hashing functions and these hashing functions may be used to hash an index (e.g., UE identification number) associated with that SL peripheral UE (e.g., an identification of the SL peripheral UE) to generate k output values, $i_k$, where $0 \le i_k < m$ and m is the length of an m-bitmap with all its bit values set initially to 0. In some aspects, for the first SL peripheral UE, the $i_k^{th}$ bit values (of which there are k of them) of the m-bitmap may be switched from 0 to 1. For the second SL peripheral UE, the $i_k^{th}$ bit values (of which there are k of them again) may either be switched from 0 to 1 or left to remain at 1 (e.g., if a switch from 0 to 1 has already been made due to the first SL peripheral UE). In some aspects, the process continues as described above for the rest of the SL peripheral UEs in the star topology network of SL peripheral UEs.

In some aspects, upon receiving a bloom-filter based control message from a SL hub UE (i.e., a group common control message including a m-bitmap constructed as discussed above), a SL peripheral UE may hash the index associated with the SL peripheral UE using the k hashing functions to generate k output values $j_k$ and check to determine if the all the $j_k^{th}$ entries of the m-bitmap are set to "1". If not, i.e., if one or more of the bit values of the $j_k^{th}$ entries are 0, then the SL peripheral UE may determine that there is no incoming data transmission from the SL hub UE to the SL peripheral UE (and as such, the SL peripheral UE may enter a power saving mode). However, all bit values of the $j_k^{th}$ entries are set to 1, then there may be, although not guaranteed, an incoming data transmission from the SL hub UE to the SL peripheral UE (and as such, the SL peripheral UE may remain in an active mode to search and/or receive the data transmission).

FIG. 5 shows an example illustration of a bloom filter-based control message from a SL hub UE to three SL peripheral UEs 502, 504 and 506, where the group common control message carries a (m=12)-bitmap 508 and each one of the three SL peripheral UEs 502, 504 and 506 is assigned k=3 hashing functions. It is to be understood that FIG. 5 is an example illustration and that k and m can have values different than 3 and 12, respectively. For example, k and m can be any natural number (e.g., provided m>k). Upon receiving the group common control message, in some aspects, each of the SL peripheral UE may generate an output values $j_k$ by using all the three hashing functions assigned to each of them to hash an index (e.g., identification number) associated with that SL peripheral UE. For example, SL peripheral UE1 502 may generate the output values by hashing its identification number "UE1 ID" using the three hashing functions assigned to it and performing a modulo operation % as follows: $j_{1\_UE1}$=hash_fn1 ("UE1 ID") % m; $j_{2\_UE1}$=hash_fn2 ("UE1 ID") % m and $j_{3\_UE1}$=hash_fn3 ("UE1 ID") % m, where $0 \leq j_{1\_UE1} < m$; $0 \leq j_{2\_UE1} < m$ and $0 \leq j_{3\_UE1} < m$. In the particular example of FIG. 5, $j_{1\_UE1}$=1, $j_{2\_UE1}$=4 and $j_{3\_UE1}$=7, and the bit values at these entries are all set to 1, indicating to UE1 502 that there may be incoming data transmission from the SL hub UE to SL peripheral UE1 502 (and as such, the SL peripheral UE may remain in an active mode to search and/or receive the data transmission). Same analysis applies to UE3 502, where $j_{1\_UE3}$=7, $j_{2\_UE3}$=9 and $j_{3\_UE3}$=11, and the bit values at these entries are all set to 1, indicating to UE3 506 that there may be incoming data transmission from the SL hub UE to SL peripheral UE1 506 (and as such, the SL peripheral UE may remain in an active mode to search and/or receive the data transmission). However, with respect to UE2 504, where $j_{1\_UE2}$=4, $j_{2\_UE3}$=6 and $j_{3\_UE3}$=9, although the bit values at $j_{1\_UE2}$=4 and $j_{3\_UE3}$=9 are set to 1, the bit value 510 at $j_{2\_UE3}$=6 is set to 0, indicating definitively to UE1 504 that there is no incoming data transmission from the SL hub UE to SL peripheral UE1 504 (and as such, the SL peripheral UE may enter a power saving mode). As such upon receiving the group common control message that includes or carries the m-bitmap 50, SL peripheral UEs UE1 502 and UE3 506 may remain in active mode to monitor or search for data transmission while SL peripheral UE UE2 may enter power saving mode (e.g., sleep mode, low-power mode, etc.). In some aspects, the group common control message can be a SCI, a MAC-CE, an upper layer control packet, and/or the like.

In some aspects, the star topology network of SL peripheral UEs may include a massive number of SL peripheral UEs (e.g., more than 50, more than 100, more than 1000, including values and subranges therebetween). In such cases, the SL hub UE may arrange the massive number of SL peripheral UEs into groups so that the bitmap-based group common control message mechanism and the filter bloom-based group common control message mechanism discussed above can be utilized efficiently. For example, in some cases, only a very small number of SL peripheral UEs, of the massive number of SL peripheral UEs, may have pending data (i.e., data transmission from the SL hub UE), and in such cases, these SL peripheral UEs may be assigned to same group by the SL hub UE. Similarly, in some cases, a very large number of SL peripheral UEs, of the massive number of SL peripheral UEs, may have pending data (i.e., data transmission from the SL hub UE), and in such cases, these SL peripheral UEs may be assigned to same group by the SL hub UE. In some aspects, for purposes of load balancing, the SL hub UE may assign some peripheral UEs, in particular those with relatively short effective traffic duty cycle, into multiple groups.

In some aspects, a SL hub UE may use both a bitmap-based group control message (e.g., as discussed with respect to FIG. 4) and a bloom filter-based group control message (e.g., as discussed with respect to FIG. 5) for controlling when SL peripheral UEs can enter power saving mode, and as such for power saving in the forward link of a star topology network of SL peripheral UEs. In such cases, the use of the bitmap-based and bloom-filter based group control messages can be hierarchically arranged. For example, a SL peripheral UE may initially read the bloom-filter based group control message and determine whether to read the bitmap-based group control message based on the results of reading the bloom-filter based group control message. For example, as discussed above, the SL peripheral UEs of the star topology network of SL peripheral UEs may be arranged into groups, and a SL peripheral UE may be assigned into multiple groups (e.g., with different identifications or indices associated with the same SL peripheral UE but corresponding to the multiple groups). In such cases, the SL peripheral UE may check for all the multiple identifications in the bloom filter-based group control message (as discussed above with respect to FIG. 5, for example) to determine whether there is any data transmission to the SL peripheral UE. If not, then the SL peripheral UE may enter power saving mode. If any of the identifications in the bloom filter-based group control message indicate that there can be a data transmission, then the SL peripheral UE may check the bitmap-based group control messages to determine if there is any upcoming (i.e., pending) data transmission.

Figure 6:
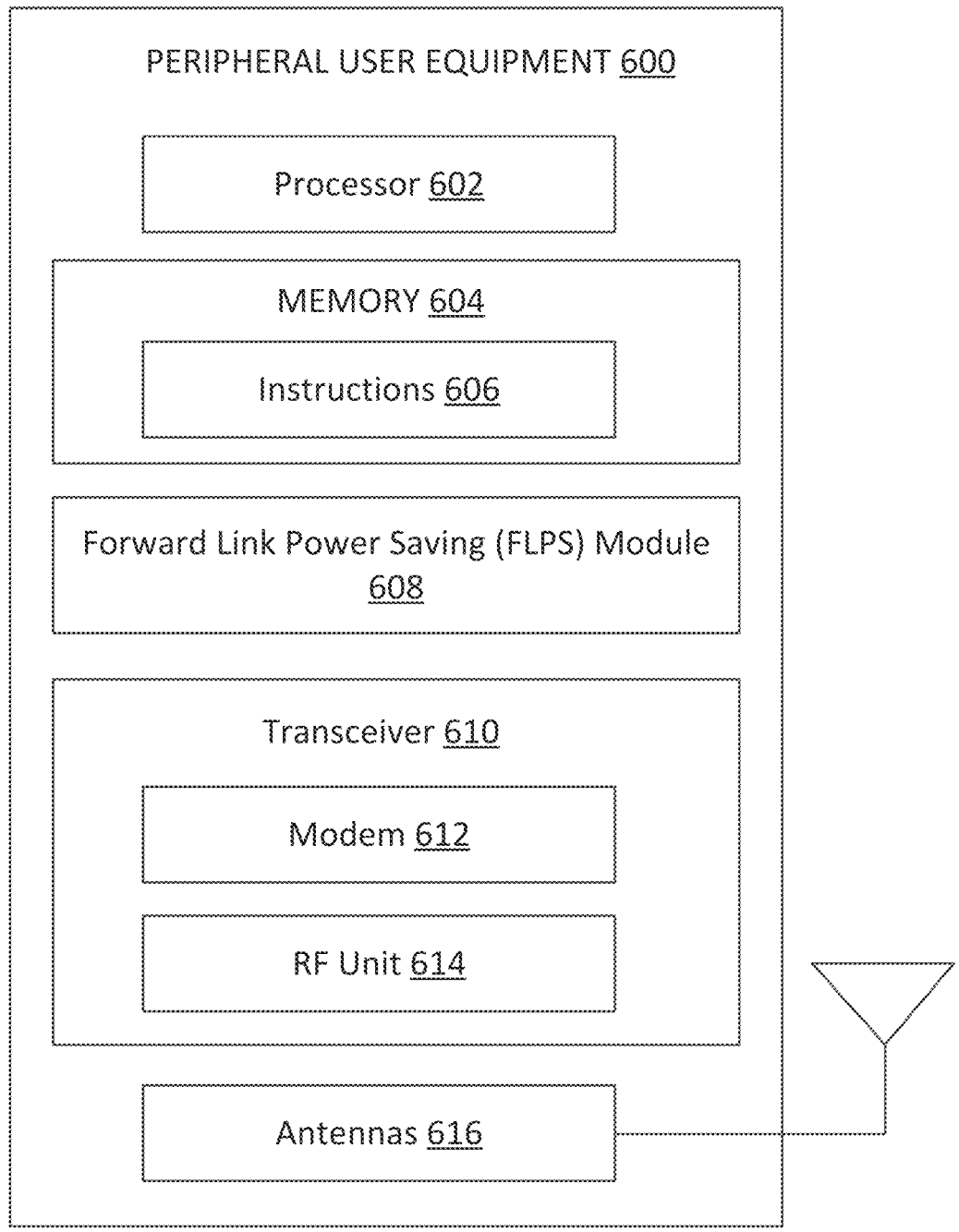
FIG. 6 is a block diagram of an exemplary peripheral UE, according to some aspects of the present disclosure.

FIG. 6 is a block diagram of an exemplary SL peripheral UE 600 according to some aspects of the present disclosure. The SL peripheral UE 600 may be a UE 115 as discussed above with respect to FIG. 1, a SL peripheral UE 206 as discussed above in FIG. 2. As shown, the SL peripheral UE 600 may include a processor 602, a memory 604, a forward link power saving (FLPS) module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-5. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The FLPS module 608 may be implemented via hardware, software, or combinations thereof. For example, the FLPS module 608 may be implemented as a processor, circuit, and/or instructions 606 stored in the memory 604 and executed by the processor 602. In some examples, the FLPS module 608 can be integrated within the modem subsystem 612. For example, the FLPS module 608 can be implemented by a combination of software components (e.g., executed by a DSP or a general processor) and hardware components (e.g., logic gates and circuitry) within the modem subsystem 612.

The FLPS module 608 may be used for various aspects of the present disclosure, for example, aspects of FIGS. 1-5. The FLPS module 608 is configured to monitoring, for a first duration, a forward link connecting a second UE (e.g., 204) to the first UE (e.g., 206) for a control message transmitted by the second UE to the first UE. The FLPS module 608 may also be configured to establish an operational mode based on a result of the monitoring for the control message.

As shown, the transceiver 610 may include the modem subsystem 612 and the RF unit 614. The transceiver 610 can be configured to communicate bi-directionally with other devices, such as the BSs 105 and/or the UEs 115, 204, and/or 206. The modem subsystem 612 may be configured to modulate and/or encode the data from the memory 604 and/or the FLPS module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PSCCH, PSSCH, PSFCH, measurement data, and/or sensor data records) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may include one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., PSBCH, sidelink RMSI, PSSCH, PSCCH, PSFCH, PC5-RRC configuration, control commands) to the FLPS module 608 for processing. The antennas 616 may include multiple antennas of similar or different designs in order to sustain multiple transmission links. The RF unit 614 may configure the antennas 616.

In an aspect, the SL peripheral UE 600 can include multiple transceivers 610 implementing different RATs (e.g., NR and LTE). In an aspect, the SL peripheral UE 600 can include a single transceiver 610 implementing multiple RATs (e.g., NR and LTE). In an aspect, the transceiver 610 can include various components, where different combinations of components can implement different RATs.

Figure 7:
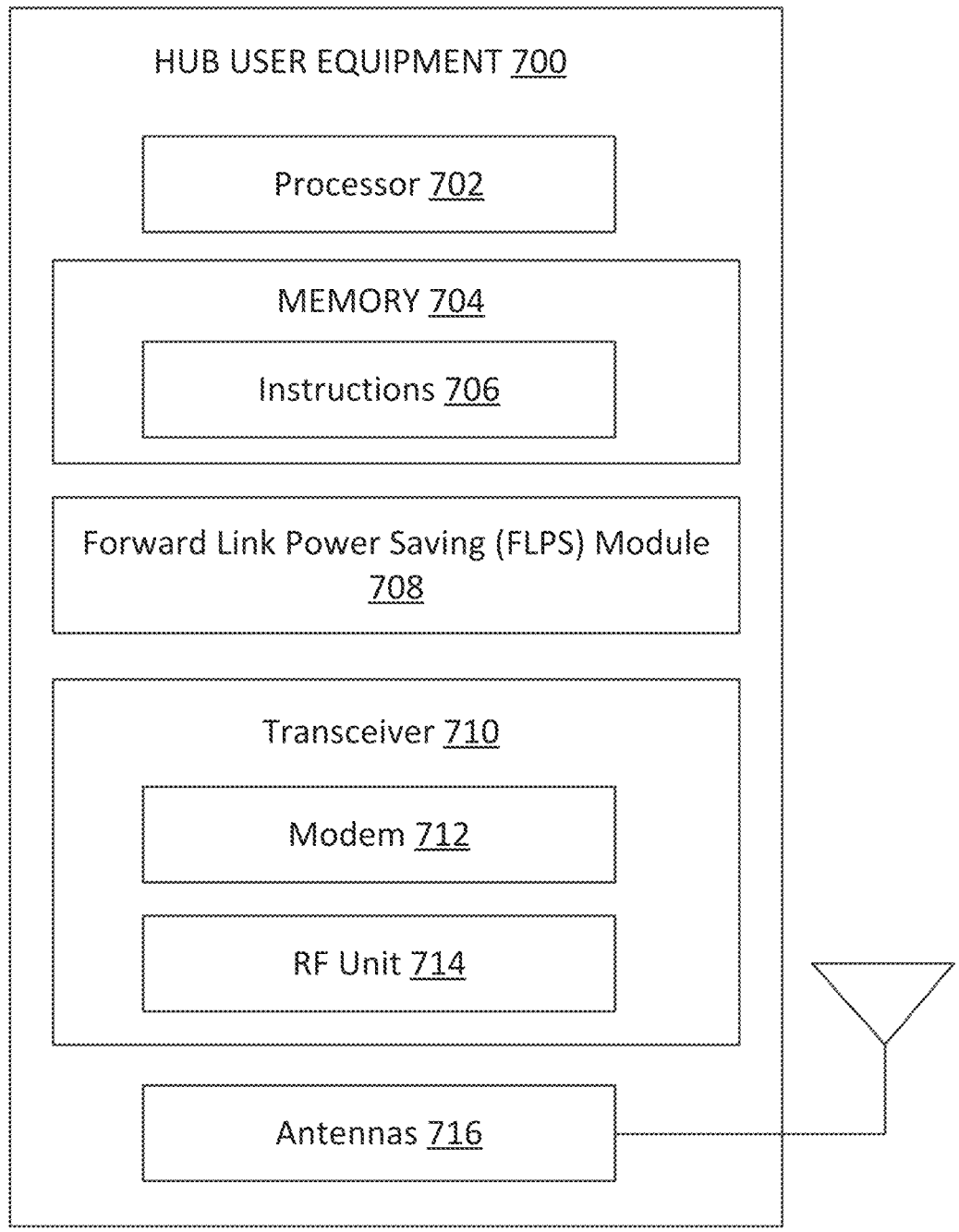
FIG. 7 is a block diagram of an exemplary hub UE, according to some aspects of the present disclosure.

FIG. 7 is a block diagram of an exemplary SL hub UE 700 according to some aspects of the present disclosure. The SL hub UE 700 may be a UE 115 in the network 100 as discussed above in FIG. 1, or a SL hub UE 204 as discussed above in FIG. 2. As shown, the SL hub UE 700 may include a processor 702, a memory 704, a forward link power saving (FLPS) module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-5. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The FLPS module 708 may be implemented via hardware, software, or combinations thereof. For example, the FLPS module 708 may be implemented as a processor, circuit, and/or instructions 706 stored in the memory 704 and executed by the processor 702. In some examples, the FLPS module 708 can be integrated within the modem subsystem 712. For example, the FLPS module 708 can be implemented by a combination of software components (e.g., executed by a DSP or a general processor) and hardware components (e.g., logic gates and circuitry) within the modem subsystem 712.

The FLPS module 708 may be used for various aspects of the present disclosure, for example, aspects of FIGS. 1-4. The FLPS module 708 can be configured to transmit to one or more SL peripheral UEs (e.g., SL peripheral UE 206a, 206b, 206c) that are in communication with a SL hub UE (e.g., SL hub UE 204a, 204b) control messages (e.g., SCI, MAC-CE, upper layer control packet, etc.). In some aspects, the control messages can be directed to individual SL peripheral UEs or can be group common control messages.

As shown, the transceiver 710 may include the modem subsystem 712 and the RF unit 714. The transceiver 710 can be configured to communicate bi-directionally with other devices, such as the UEs 115, and/or the UEs 115, 204, and/or 206, and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 712 (on outbound transmissions) or of transmissions originating from another source such as a UE 115. The RF unit 714 may be further configured to perform analog beamforming in conjunction with the digital beamforming. Although shown as integrated together in transceiver 710, the modem subsystem 712 and/or the RF unit 714 may be separate devices that are coupled together at a UE 115, or 204 to enable the UE 115, 204 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., PSCCH, PSSCH, PSFCH, measurement data, and/or sensor data records) to the FLPS module 708 for processing. The antennas 716 may include multiple antennas of similar or different designs in order to sustain multiple transmission links.

In an aspect, the SL hub UE 700 can include multiple transceivers 710 implementing different RATs (e.g., NR and LTE). In an aspect, the SL hub UE 700 can include a single transceiver 710 implementing multiple RATs (e.g., NR and LTE). In an aspect, the transceiver 710 can include various components, where different combinations of components can implement different RATs.

Figure 8:
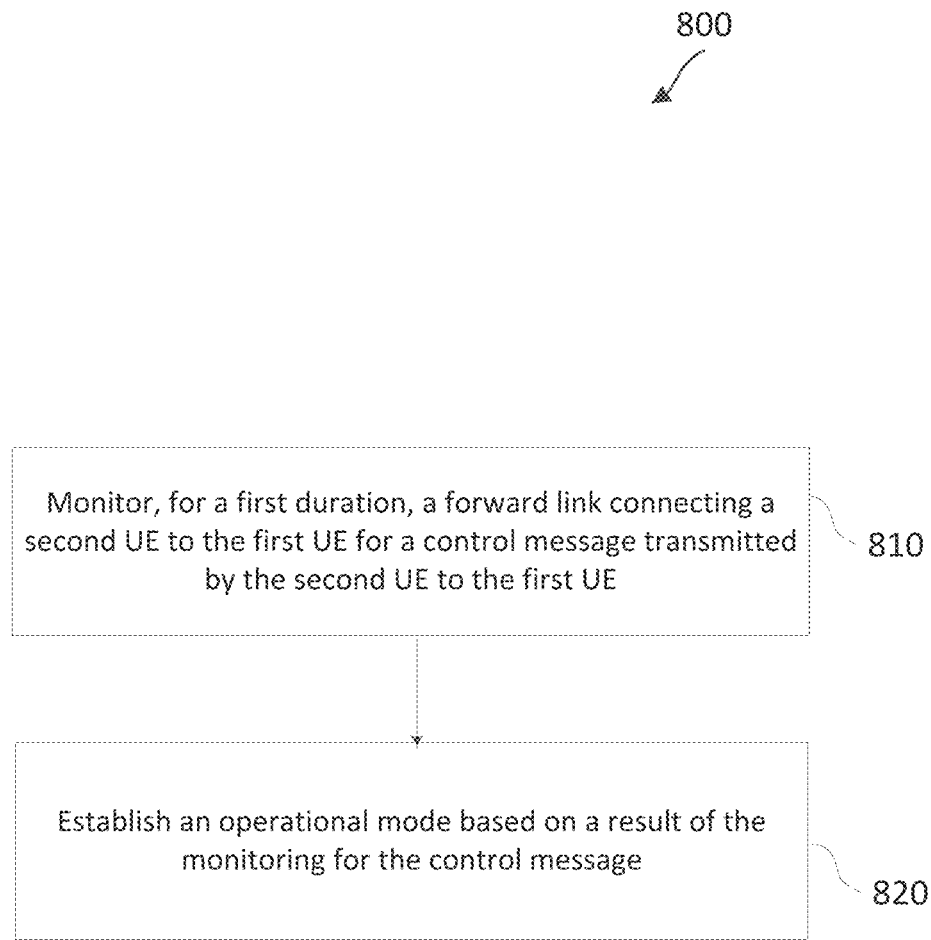
FIG. 8 is a flow diagram illustrating a forward link power saving method for new radio star topology network of UEs, according to some aspects of the present disclosure.

FIG. 8 is a flow diagram illustrating a forward link power saving method for new radio star topology network of UEs, according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as a UE 115, a SL peripheral UE 206, or a SL peripheral UE 600, may utilize one or more components, such as the processor 602, the memory 604, the FLPS module 608, the transceiver 610, the modem 612, and/or the one or more antennas 616, to execute the steps of method 800. The method 800 may employ similar mechanisms as described above in FIGS. 1-5. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, a first UE (e.g., sidelink peripheral UE) may monitor, for a first duration, a forward link connecting a second UE (e.g., sidelink hub UE) to the first UE for a control message transmitted by the second UE to the first UE.

At block 820, the first UE may establish an operational mode based on a result of the monitoring for the control message.

In some aspects, the result of the monitoring includes receiving the control message indicating upcoming arrival, at the first UE and a second duration after the receiving the control message, of data transmission from the second UE. Further, establishing the operational mode based on the result of the monitoring includes entering an active mode for at least the second duration. In some aspects, the control message includes a value for overriding a pre-configured value of the second duration. Further, the value for overriding the pre-configured value is determined based on an amount of the data transmission from the second UE.

In some aspects, the result of the monitoring includes receiving no indication (e.g., receiving no control message or receiving the control message with no indication) about upcoming arrival or non-arrival at the first UE of data transmission from the second UE. Further, establishing the operational mode based on the result of the monitoring includes remaining in an active mode for a second duration after end of the first duration to monitor the forward link for the data transmission from the second UE.

In some aspects, the result of the monitoring includes receiving the control message indicating upcoming non-arrival at the first UE of data transmission from the second UE. Further, establishing the operational mode based on the result of the monitoring includes entering a power saving mode for a second duration. In some aspects, the monitoring the forward link occurs periodically. In such cases, the second duration can equal a difference between a periodicity of the monitoring and the first duration.

In some aspects, the result of the monitoring includes receiving the control message including no indication about upcoming arrival or non-arrival at the first UE of data transmission from the second UE, wherein the control message includes a value for overriding a pre-configured value of a second duration after end of the first duration during which the first UE is configured to monitor the forward link for the data transmission from the second UE.

In some aspects, the control message includes an indication indicating upcoming arrival or non-arrival at the first UE of a first data transmission from the second UE. Further, the indication can be appended to a second data transmission transmitted by the second UE to the first UE via a physical sidelink shared channel (PSSCH) of the forward link.

In some aspects, the control message is configured to be transmitted by the second UE to the first UE via a physical sidelink control channel (PSCCH) of a new radio unlicensed (NR-U) frequency band. In some aspects, the control message is a group common control message including (i) an indication of upcoming arrival, (ii) an indication of upcoming non-arrival or (iii) no indication of upcoming arrival or non-arrival, of data transmission from the second UE, at each UE of a plurality of UEs including the first UE. For example, the group common control message may include a bitmap having, for each UE of the plurality of UEs, an index associated with that UE and (i) the indication of upcoming arrival at that UE, (ii) the indication of upcoming non-arrival at that UE, or (iii) the no indication of upcoming arrival or non-arrival at that UE, of data transmission from the second UE. In such instances, the UE may further identify, from the group common control message, the index associated with the first UE. Further, the UE may establish the operational mode based on the result of the monitoring includes establishing the operational mode based on the indication of upcoming arrival at the first UE, (ii) the indication of upcoming non-arrival at the first UE, or (iii) the no indication of upcoming arrival or non-arrival at the first UE, of data transmission from the second UE.

In some aspects, the group common control message includes a bloom filter having, for each UE of the plurality of UEs, (i) the indication of upcoming arrival at that UE, (ii) the indication of upcoming non-arrival at that UE, or (iii) the no indication of upcoming arrival or non-arrival at that UE, of data transmission from the second UE. In some aspects, the bloom filter is generated at least in part by hashing an identification of each UE of the plurality of UEs.

In some aspects, the control message is a group common control message including a first group common control message associated with a first plurality of UEs and a second group common control message associated with a second plurality of UEs. In such cases, the first group common control message may include an indication of upcoming arrival, at each UE of the first plurality of UEs, of data transmission from the second UE. Further, the second group common control message may include an indication of upcoming non-arrival, at each UE of the second plurality of UEs, of data transmission from the second UE. In addition, the first plurality of UEs or the second plurality of UEs may include the first UE.

In some aspects, the control message includes a first group common control message having a bloom filter and a second group common control message having a bitmap. In such instances, the UE may access, in response to the monitoring, the first group common control message. The UE may determine to access the second group common control message based on the first group common control message.

In some aspects, the UE may be configured to exit a power saving mode immediately prior to the monitoring the forward link for the control message. In some aspects, the control message is a sidelink control information (SCI). In some aspects, the control message is a medium access control (MAC)-control element (CE) message.

Recitation of Some Aspects of the Present Disclosure

Aspect 1: A method of wireless communication performed by a first user equipment (UE), the method comprising: monitoring, for a first duration, a forward link connecting a second UE to the first UE for a control message transmitted by the second UE to the first UE; and establishing an operational mode based on a result of the monitoring for the control message.

Aspect 2: The method of aspect 1, wherein: the result of the monitoring includes receiving the control message indicating upcoming arrival, at the first UE and a second duration after the receiving the control message, of data transmission from the second UE; and establishing the operational mode based on the result of the monitoring includes operating in an active mode for at least the second duration.

Aspect 3: The method of aspect 2, wherein the control message includes a value for overriding a pre-configured value of the second duration.

Aspect 4: The method of aspect 3, wherein the value for overriding the pre-configured value is determined based on an amount of the data transmission from the second UE.

Aspect 5: The method of any of aspects 1-4, wherein: the result of the monitoring includes receiving no indication about upcoming arrival or non-arrival at the first UE of data transmission from the second UE; and establishing the operational mode based on the result of the monitoring includes operating in an active mode for a second duration after end of the first duration to monitor the forward link for the data transmission from the second UE.

Aspect 6: The method of any of aspects 1-5, wherein: the result of the monitoring includes receiving the control message indicating upcoming non-arrival at the first UE of data transmission from the second UE; and establishing the operational mode based on the result of the monitoring includes entering a power saving mode for a second duration.

Aspect 7: The method of any of aspects 1-6, wherein the monitoring the forward link occurs periodically.

Aspect 8: The method of aspect 6, wherein: the monitoring the forward link occurs periodically; and the second duration equals a difference between a periodicity of the monitoring and the first duration.

Aspect 9: The method of any of aspects 1-8, wherein: the result of the monitoring includes receiving the control message including no indication about upcoming arrival or non-arrival at the first UE of data transmission from the second UE, the control message including a value for overriding a pre-configured value of a second duration after end of the first duration during which the first UE is configured to monitor the forward link for the data transmission from the second UE.

Aspect 10: The method of any of aspects 1-9, wherein: the control message includes an indication indicating upcoming arrival or non-arrival at the first UE of a first data transmission from the second UE; and the indication is appended to a second data transmission transmitted by the second UE to the first UE via a physical sidelink shared channel (PSSCH) of the forward link.

Aspect 11: The method of any of aspects 1-10, wherein the control message is configured to be transmitted by the second UE to the first UE via a physical sidelink control channel (PSCCH) of a new radio unlicensed (NR-U) frequency band.

Aspect 12: The method of any of aspects 1-11, wherein the control message is a group common control message including (i) an indication of upcoming arrival, (ii) an indication of upcoming non-arrival, or (iii) no indication of upcoming arrival or non-arrival, of data transmission from the second UE, at each UE of a plurality of UEs including the first UE.

Aspect 13: The method of aspect 12, wherein the group common control message includes a bitmap having, for each UE of the plurality of UEs, an index associated with that UE and (i) the indication of upcoming arrival at that UE, (ii) the indication of upcoming non-arrival at that UE, or (iii) the no indication of upcoming arrival or non-arrival at that UE, of data transmission from the second UE.

Aspect 14: The method of aspect 13, further comprising: identifying, from the group common control message, the index associated with the first UE; and establishing the operational mode based on the result of the monitoring includes establishing the operational mode based on (i) the indication of upcoming arrival at the first UE, (ii) the indication of upcoming non-arrival at the first UE, or (iii) the no indication of upcoming arrival or non-arrival at the first UE, of data transmission from the second UE.

Aspect 15: The method of aspect 12, wherein the group common control message includes a bloom filter having, for each UE of the plurality of UEs, (i) the indication of upcoming arrival at that UE, (ii) the indication of upcoming non-arrival at that UE, or (iii) the no indication of upcoming arrival or non-arrival at that UE, of data transmission from the second UE.

Aspect 16: The method of aspect 15, wherein the bloom filter is generated at least in part by hashing an identification of each UE of the plurality of UEs.

Aspect 17: The method of any of aspects 1-16, wherein the control message is a group common control message including a first group common control message associated with a first plurality of UEs and a second group common control message associated with a second plurality of UEs, the first group common control message including an indication of upcoming arrival, at each UE of the first plurality of UEs, of data transmission from the second UE; the second group common control message including an indication of upcoming non-arrival, at each UE of the second plurality of UEs, of data transmission from the second UE; and the first plurality of UEs or the second plurality of UEs including the first UE.

Aspect 18: The method of any of aspects 1-17, wherein the control message includes a first group common control message having a bloom filter and a second group common control message having a bitmap, the method further comprising: accessing, in response to the monitoring, the first group common control message; and determining to access the second group common control message based on the first group common control message.

Aspect 19: The method of any of aspects 1-18, further comprising: exiting a power saving mode immediately prior to the monitoring the forward link for the control message.

Aspect 20: The method of any of aspects 1-19, wherein the control message is a sidelink control information (SCI).

Aspect 21: The method of any of aspects 1-20, wherein the control message is a medium access control (MAC)-control element (CE) message.

Aspect 22: A user equipment (UE), comprising: a memory; a processor coupled to the memory; and a transceiver coupled to the processor, the UE configured to perform the methods of aspects 1-21.

Aspect 23: A user equipment (UE) comprising means for performing the methods of aspects 1-21.

Aspect 24: A non-transitory computer-readable medium (CRM) having program code recorded thereon, the program code comprises code for causing a UE to perform the methods of aspects 1-21.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
monitoring, for a first duration, a forward link connecting a second UE to the first UE for a control message transmitted by the second UE to the first UE, wherein the control message is a group common control message including a first group common control message having an indication of a bloom filter and a second group common control message having a bitmap having an index associated with each UE of a plurality of UEs;

establishing an operational mode for a second duration immediately following the first duration based on the bitmap and the indication of the bloom filter of the control message;

accessing, in response to the monitoring, the first group common control message; and determining to access the second group common control message based on the first group common control message, wherein the operational mode is one of an active mode or a power saving mode.

2. The method of claim 1, wherein:
a result of the monitoring includes receiving the control message indicating upcoming arrival, at the first UE and the second duration after the receiving the control message, of data transmission from the second UE; and
establishing the operational mode based on the result of the monitoring includes operating in the active mode for at least the second duration.

3. The method of claim 1, wherein:
a result of the monitoring includes receiving no indication about upcoming arrival or non-arrival, at the first UE, of data transmission from the second UE; and
establishing the operational mode based on the result of the monitoring includes operating in the active mode for the second duration after end of the first duration to monitor the forward link for the data transmission from the second UE.

4. The method of claim 1, wherein:
a result of the monitoring includes receiving the control message indicating upcoming non-arrival, at the first UE, of data transmission from the second UE; and
establishing the operational mode based on the result of the monitoring includes entering the power saving mode for the second duration.

5. The method of claim 1, wherein the monitoring the forward link comprises monitoring the forward link periodically.

6. The method of claim 1, wherein:
a result of the monitoring includes receiving the control message including no indication about upcoming arrival or non-arrival, at the first UE, of data transmission from the second UE; and
the control message includes a value for overriding a pre-configured value of the second duration after end of the first duration during which the first UE is configured to monitor the forward link for the data transmission from the second UE.

7. The method of claim 1, wherein:
the control message includes an indication indicating upcoming arrival or non-arrival at the first UE of a first data transmission from the second UE; and
the indication is appended to a second data transmission transmitted by the second UE to the first UE via a physical sidelink shared channel (PSSCH) of the forward link.

8. The method of claim 1, wherein the control message is configured to be transmitted by the second UE to the first UE via a physical sidelink control channel (PSCCH) of a new radio unlicensed (NR-U) frequency band.

9. The method of claim 1, wherein the control message includes at least one of (i) an indication of upcoming arrival, (ii) an indication of upcoming non-arrival, or (iii) no indication of upcoming arrival or non-arrival, of data transmission from the second UE, at each UE of a plurality of UEs including the first UE.

10. The method of claim 9, wherein the bitmap has, for each UE of the plurality of UEs, an index associated with each UE and (i) the indication of upcoming arrival at each UE, (ii) the indication of upcoming non-arrival at each UE, or (iii) the no indication of upcoming arrival or non-arrival at each UE, of data transmission from the second UE.

11. The method of claim 1, wherein:
the control message includes a first group common control message associated with a first plurality of UEs and a second group common control message associated with a second plurality of UEs;
the first group common control message includes an indication of upcoming arrival, at each UE of the first plurality of UEs, of data transmission from the second UE;
the second group common control message includes an indication of upcoming non-arrival, at each UE of the second plurality of UEs, of data transmission from the second UE; and
the first plurality of UEs or the second plurality of UEs includes the first UE.

12. The method of claim 1, further comprising:
exiting the power saving mode immediately prior to the monitoring the forward link for the control message.

13. The method of claim 1, wherein the control message is sidelink control information (SCI).

14. A first user equipment (UE), comprising:
a memory;
a transceiver; and
at least one processor coupled to the memory and the transceiver, wherein the first UE is configured to:
monitor, for a first duration, a forward link connecting a second UE to the first UE for a control message transmitted by the second UE to the first UE, wherein the control message is a group common control message including a first group common control message having an indication of a bloom filter and a second group common control message having a bitmap having an index associated with each UE of a plurality of UEs;
establish an operational mode for a second duration immediately following the first duration of the first UE based on the bitmap and the indication of the bloom filter of the control message;
accessing, in response to the monitoring, the first group common control message; and
determining to access the second group common control message based on the first group common control message,
wherein the operational mode is one of an active mode or a power saving mode.

15. The first UE of claim 14, wherein:
a result of the monitoring includes receiving the control message indicating upcoming arrival, at the first UE and the second duration after the receiving the control message, of data transmission from the second UE; and
the processor is configured to establish the operational mode by entering the active mode for at least the second duration.

16. The first UE of claim 14, wherein:
a result of the monitoring includes receiving the control message including no indication about upcoming arrival or non-arrival, at the first UE, of data transmission from the second UE; and the first UE is configured to establish the operational mode by remaining in the active mode for the second duration after end of the first duration to monitor the forward link for the data transmission from the second UE.

17. The first UE of claim 14, wherein:
a result of the monitoring includes receiving the control message indicating upcoming non-arrival, at the first UE, of data transmission from the second UE; and
the processor is configured to establish the operational mode by entering the power saving mode for the second duration.

18. The first UE of claim 14, wherein the first UE is further configured to monitor the forward link periodically.

19. The first UE of claim 14, wherein:
a result of the monitoring includes receiving the control message including no indication about upcoming arrival or non-arrival, at the first UE, of data transmission from the second UE; and
the control message includes a value for overriding a pre-configured value of the second duration after end of the first duration during which the first UE is configured to monitor the forward link for the data transmission from the second UE.

20. The first UE of claim 14, wherein:
the control message includes an indication indicating upcoming arrival or non-arrival at the first UE of a first data transmission from the second UE; and
the indication is appended to a second data transmission transmitted by the second UE to the first UE via a physical sidelink shared channel (PSSCH) of the forward link.

21. The first UE of claim 14, wherein the control message is configured to be transmitted by the second UE to the first UE via a physical sidelink control channel (PSCCH) of a new radio unlicensed (NR-U) frequency band.

22. The first UE of claim 14, wherein the control message includes at least one of (i) an indication of upcoming arrival, (ii) an indication of upcoming non-arrival, or (iii) no indication of upcoming arrival or non-arrival, of data transmission from the second UE, at each UE of a plurality of UEs including the first UE.

23. The first UE of claim 22, wherein the group common control message includes the bloom filter having, for each UE of the plurality of UEs, (i) the indication of upcoming arrival at that UE, (ii) the indication of upcoming non-arrival at that UE, or (iii) the no indication of upcoming arrival or non-arrival at that UE, of data transmission from the second UE.

24. The first UE of claim 14, wherein:
the control message includes a first group common control message associated with a first plurality of UEs and a second group common control message associated with a second plurality of UEs;
the first group common control message includes an indication of upcoming arrival, at each UE of the first plurality of UEs, of data transmission from the second UE;
the second group common control message includes an indication of upcoming non-arrival, at each UE of the second plurality of UEs, of data transmission from the second UE; and
the first plurality of UEs and the second plurality of UEs includes the first UE.

25. The first UE of claim 14, wherein the first UE is further configured to:
exit the power saving mode immediately prior to the monitoring the forward link for the control message.

26. The first UE of claim 14, wherein the control message is a medium access control (MAC)-control element (CE) message.

27. A non-transitory computer-readable medium (CRM) having program code recorded thereon, the program code comprising:
code for causing a first user equipment (UE) to monitor, for a first duration, a forward link connecting a second UE to the first UE for a control message transmitted by the second UE to the first UE, wherein the control message is a group common control message including a first group common control message having an indication of a bloom filter and a second group common control message having a bitmap having an index associated with each UE of a plurality of UEs;
code for causing the first UE to establish an operational mode for a second duration immediately following the first duration based on the bitmap and the indication of the bloom filter of the control message;
code for causing the first UE to access, in response to the monitoring, the first group common control message; and
code for causing the first UE to determine to access the second group common control message based on the first group common control message,
wherein the operational mode is one of an active mode or a power saving mode.

28. A first user equipment (UE) comprising:
means for monitoring, for a first duration, a forward link connecting a second UE to the first UE for a control message transmitted by the second UE to the first UE, wherein the control message is a group common control message including a first group common control message having an indication of a bloom filter and a second group common control message having a bitmap having an index associated with each UE of a plurality of UEs;
means for establishing an operational mode for a second duration immediately following the first duration based on the bitmap and the indication of the bloom filter of the control message;
means for accessing, in response to the monitoring, the first group common control message; and
means for determining to access the second group common control message based on the first group common control message,
wherein the operational mode is one of an active mode or a power saving mode.

* * * * *